United States Patent
Ikeda et al.

(10) Patent No.: US 7,117,492 B2
(45) Date of Patent: Oct. 3, 2006

(54) EXCLUSIVE ACCESS CONTROLLING APPARATUS, EXCLUSIVE ACCESS CONTROLLING METHOD AND RECORDING MEDIUM RECORDED WITH EXCLUSIVE ACCESS CONTROLLING PROGRAM, FOR ELECTRONIC INFORMATION

(75) Inventors: Junji Ikeda, Kawasaki (JP); Hiroyuki Akamatsu, Kawasaki (JP); Tsuyoshi Ebata, Kawasaki (JP); Nobuyuki Kanaya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 822 days.

(21) Appl. No.: 09/823,755

(22) Filed: Apr. 3, 2001

(65) Prior Publication Data

US 2001/0018763 A1    Aug. 30, 2001

Related U.S. Application Data

(63) Continuation of application No. PCT/JP99/00090, filed on Jan. 13, 1999.

(51) Int. Cl.
G06F 9/44 (2006.01)
G06F 7/20 (2006.01)

(52) U.S. Cl. ............................. 717/170; 717/122; 707/8

(58) Field of Classification Search ................ 717/169, 717/170, 172, 122; 707/103
See application file for complete search history.

(56) References Cited

U.S. PATENT DOCUMENTS 5,586,304 A * 12/1996 Stupek et al. ............... 717/170
5,806,078 A * 9/1998 Hug et al. ................... 715/511
5,857,107 A * 1/1999 Tsuchida ..................... 717/170
5,878,432 A * 3/1999 Misheski et al. ........ 707/103 R
5,881,292 A * 3/1999 Sigal et al. .................. 717/170

FOREIGN PATENT DOCUMENTS

| JP | 4-127261 | 4/1992 |
|---|---|---|
| JP | 4-337850 | 11/1992 |
| JP | 6-202923 | 7/1994 |
| JP | 6-314227 | 11/1994 |
| JP | 8-147205 | 6/1996 |
| JP | 8-328933 | 12/1996 |
| JP | 9-114714 | 5/1997 |
| JP | 10-3417 | 1/1998 |

* cited by examiner

Primary Examiner—Tuan Dam
Assistant Examiner—Eric B. Kiss
(74) Attorney, Agent, or Firm—Staas & Halsey LLP

(57) ABSTRACT

An electronic information name of electronic information prepared by attaching a version number of the electronic information with a unique appellation of the electronic information is distributed to users of electronic information. Based on this electronic information name, accesses to the electronic information are conducted. There is further provided a table for holding the version number of the electronic information, and the version number held in the table is changed such as by a locking request, a locking release request for the electronic information. Upon an access request to the electronic information, the version number included in the electronic information name is compared with the version number held in the table, so as to judge whether or not the access to the electronic information is to be permitted, to thereby conduct an exclusive access control of the electronic information.

10 Claims, 5 Drawing Sheets

US 7,117,492 B2

EXCLUSIVE ACCESS CONTROLLING APPARATUS, EXCLUSIVE ACCESS CONTROLLING METHOD AND RECORDING MEDIUM RECORDED WITH EXCLUSIVE ACCESS CONTROLLING PROGRAM, FOR ELECTRONIC INFORMATION

This application is a continuation of PCT/JP99/00090 filed on Jan. 13, 1999.

TECHNICAL FIELD

The present invention relates to an exclusive access controlling technique for exclusively controlling access to electronic information, and more particularly to a technique for realizing a more reliable exclusive access control with a simple constitution.

BACKGROUND ART

As a conventional exclusive access controlling technique for electronic information, there has been known one for conducting an exclusive access control by a semaphore parameter as disclosed in Japanese Unexamined Patent Publication No. 4-127261. This technique utilizes the semaphore parameter as a flag indicating a used/unused status of electronic information, to thereby realize the exclusive access control for electronic information.

However, the exclusive access control based on only the used/unused status causes a problem in that the access to electronic information is possible at any time, insofar as the electronic information is unused. For example, in case of substantially simultaneous updating requests from two clients for electronic information on a server, it may happen that the electronic information is updated in response to the updating request from one of the clients and thereafter further updated in response to the updating request from the other client. Thus, the updating request from the one client may be perfectly nullified, resulting in deterioration of the stability and reliability of the electronic information.

To avoid such a defect, it is conceivable to conduct an exclusive access control, taking account of the version number of the electronic information. However, in the prior art, since a process for version management is needed to be conducted separately, this renders the process for the exclusive access control redundant.

The present invention has been carried out in view of the conventional problems as described above, and it is therefore an object of the present invention to provide a technique for realizing an exclusive access control having higher reliability with a simple constitution, by utilizing a version number of electronic information, as a part of a semaphore parameter.

DISCLOSURE OF THE INVENTION

To achieve the above object, the present invention provides, as a first aspect, an exclusive access controlling apparatus for electronic information comprising: version number holding means for holding a version number of electronic information; electronic information name creating means for creating an electronic information name to be prepared by attaching the version number held in the version number holding means to an appellation unique to the electronic information; electronic information name distributing means for distributing the electronic information name created by the electronic information name creating means, to users of the electronic information; version number judging means for judging whether or not the version number included in the electronic information name coincides with the version number held in the version number holding means, when the electronic information to be specified by the electronic information name is subject to an access by each user of the electronic information; access permitting means for permitting an access to the electronic information, when it is judged by the version number judging means that the two version numbers coincide with each other; and version number updating means for updating the version number held in the version number holding means, when the contents of the electronic information have been updated.

Here, "electronic information" means information accessible by an electronic computer, and includes data objects on a memory and files on an external storage device, for example.

According to such a constitution, users of the electronic information are distributed with the electronic information name including the version number of the electronic information. It is judged whether or not the version number included in the electronic information name coincides with the version number held in the version number holding means, when the electronic information is subject to an access by each user of the electronic information. An access to the electronic information is permitted only when the two version numbers coincide with each other. Further, the version number held in the version number holding means is updated, when the contents of the electronic information have been updated. Namely, when the electronic information is subject to accesses by a plurality of users and the contents of the electronic information are updated by the access from a first user, the accesses from those users other than the first user are not permitted for the reason that each of the version numbers of such users is discrepant from the updated version number. Thus, it becomes possible to realize an exclusive access control having higher reliability with a simple constitution, by utilizing the version number of the electronic information, as a part of a semaphore parameter.

The exclusive access controlling apparatus for electronic information may further comprise: reason analysis means for analyzing, based on the version number held in the version number holding means, a reason of a discrepancy between the both version numbers when they are judged to be discrepant from each other by the version number judging means.

According to such a constitution, an analysis is made on the reason why an access from each user of the electronic information is not permitted, based on the version number held in the version number holding means. This allows each user to understand the reason why the access is not permitted, to improve the operability of the exclusive access controlling apparatus for electronic information.

The exclusive access controlling apparatus for electronic information may further comprise: electronic information name re-distributing means for re-distributing an electronic information name newly created by the electronic information name creating means to users of the electronic information, when the contents of the electronic information have been updated.

According to such a constitution, a newly created electronic information name is re-distributed to users of the electronic information, when the contents of the electronic information have been updated. The electronic information name to be re-distributed includes the updated version number. Thus, each user is allowed to access to the electronic information making use of the re-distributed electronic information name, again and again as required.

The version number updating means may be constituted to set a version number of electronic information at 0 (zero) when the exclusive access control of the electronic information is started, while increase the version number of the electronic information by 1 (one) during the electronic information is being accessed and increasing the version number of the electronic information by 2 (two) when the contents of the electronic information have been updated.

According to such a constitution, the version number of the electronic information is initialized to 0 (zero) when starting the exclusive access control of the electronic information, and then increased by 2 (two) in such a manner of "2, 4, 6, . . . " each time the contents of the electronic information have been updated. Further, the version number of the electronic information is increased by 1 (one) in such a manner of "1, 3, 5, . . . " during access to the electronic information. Thus, it becomes possible to readily understand the accessed state and version number of the electronic information, by checking the version number held in the version number holding means.

Further, the reason analysis means may be constituted to: judge that the electronic information is being locked, when the version number of the electronic information is an odd number; and judge that the access to the electronic information is targeted at the electronic information of the former version when the version number of the electronic information is an even number.

According to such a constitution, an analysis is made on the reason why the access to the electronic information is not permitted, by simply judging which of an odd number and even number the version number held in the version number holding means is. Thus, the analyzing process is never complicated, to thereby avoid deterioration of the performance of the exclusive access controlling apparatus for electronic information.

The version number updating means may be constituted to set a version number of electronic information at 0 (zero) when the exclusive access control of the electronic information is started, while increasing the version number of the electronic information by 1 (one), in advance of creation of the electronic information name by the electronic information name creating means and additionally increasing the version number of the electronic information by 1 (one) when the contents of the electronic information have been updated, while.

According to such a constitution, the version number of the electronic information is initialized to 0 (zero) when the exclusive access control of the electronic information is started, and increased by 1 (one) before the electronic information name is distributed to users of the electronic information. Then, the version number of the electronic information is additionally increased by 1 (one) when the contents of the electronic information have been updated by the access from one user. Thus, it becomes possible to readily understand the accessed state and version number of electronic information, by checking the version number held in the version number holding means, even in a case of designating a plurality of electronic information to thereby perform an access of the electronic information by batch process (i.e., contents update).

The reason analysis means may be constituted to: judge that the access to the electronic information is targeted at the electronic information of the former version when the version number of the electronic information is an even number; and judge that the electronic information is in an access inhibited state, when the version number of the electronic information is an odd number.

According to such a constitution, an analysis is made on the reason why the access to the electronic information is not permitted, by simply judging which of an odd number and even number the version number held in the version number holding means is. Thus, the analyzing process is never complicated, to thereby avoid deterioration of the performance of the exclusive access controlling apparatus for electronic information.

The present invention provides, as a second aspect, an exclusive access controlling method for electronic information, comprising: an electronic information name creating process for creating an electronic information name to be prepared by attaching a version number of electronic information held in a table to an appellation unique to the electronic information; an electronic information name distributing process for distributing the electronic information name created by the electronic information name creating process, to users of the electronic information; a version number judging process for judging whether or not the version number included in the electronic information name coincides with the version number held in the table, when the electronic information to be specified by the electronic information name is subject to an access by each user of the electronic information; an access permitting process for permitting an access to the electronic information, when it is judged by the version number judging process that the two version numbers coincide with each other; and a version number updating process for updating the version number held in the table, when the contents of the electronic information have been updated.

According to such a constitution, users of the electronic information are distributed with the electronic information name including the version number of the electronic information. It is judged whether or not the version number included in the electronic information name coincides with the version number held in the table, when the electronic information is subject to an access by each user of the electronic information. An access to the electronic information is permitted, only when the two version numbers coincide with each other. Further, the version number held in the table is updated, when the contents of the electronic information have been updated. Namely, when the electronic information is subject to accesses by a plurality of users and the contents of the electronic information are updated by the access from a first user, the accesses from those users other than the first user are not permitted for the reason that each of the version numbers of such users is discrepant from the updated version number. Thus, it becomes possible to realize an exclusive access control having higher reliability with a simple constitution, by utilizing the version number of the electronic information, as a part of a semaphore parameter.

The present invention provides, as a third aspect, a recording medium recorded with an exclusive access controlling program for electronic information, for realizing: an electronic information name creating function for creating an electronic information name to be prepared by attaching a version number of electronic information held in a table with an appellation unique to the electronic information; an electronic information name distributing function for distributing the electronic information name created by the electronic information name creating function, to users of the electronic information; a version number judging function for judging whether or not the version number included in the electronic information name coincides with the version number held in the table, when the electronic information to be specified by the electronic information name is subject to an access by each user of the electronic information; an access permitting function for permitting an access to the electronic information, when it is judged by the version number judging function that the two version numbers coincide with each other; and a version number updating function for updating the version number held in the table, when the contents of the electronic information have been updated.

The term "recording medium" includes those mediums capable of assuredly recording various information such that the information recorded therein can be assuredly read out therefrom as required, and is applicable to a mobile medium such as a magnetic tape, magnetic disk, magnetic drum, IC card, and CD-ROM.

According to such a constitution, the recording medium is recorded with the exclusive access controlling program for electronic information for realizing the electronic information name creating function, electronic information name distributing function, version number judging function, access permitting function and version number updating function. Thus, such a recording medium allows to readily construct the exclusive access controlling apparatus for electronic information according to the present invention making use of a general client/server system.

BEST MODE FOR CARRYING OUT THE INVENTION

There will be described hereinafter an embodiment according to the present invention in detail, with reference to the accompanying drawings.

Figure 1:
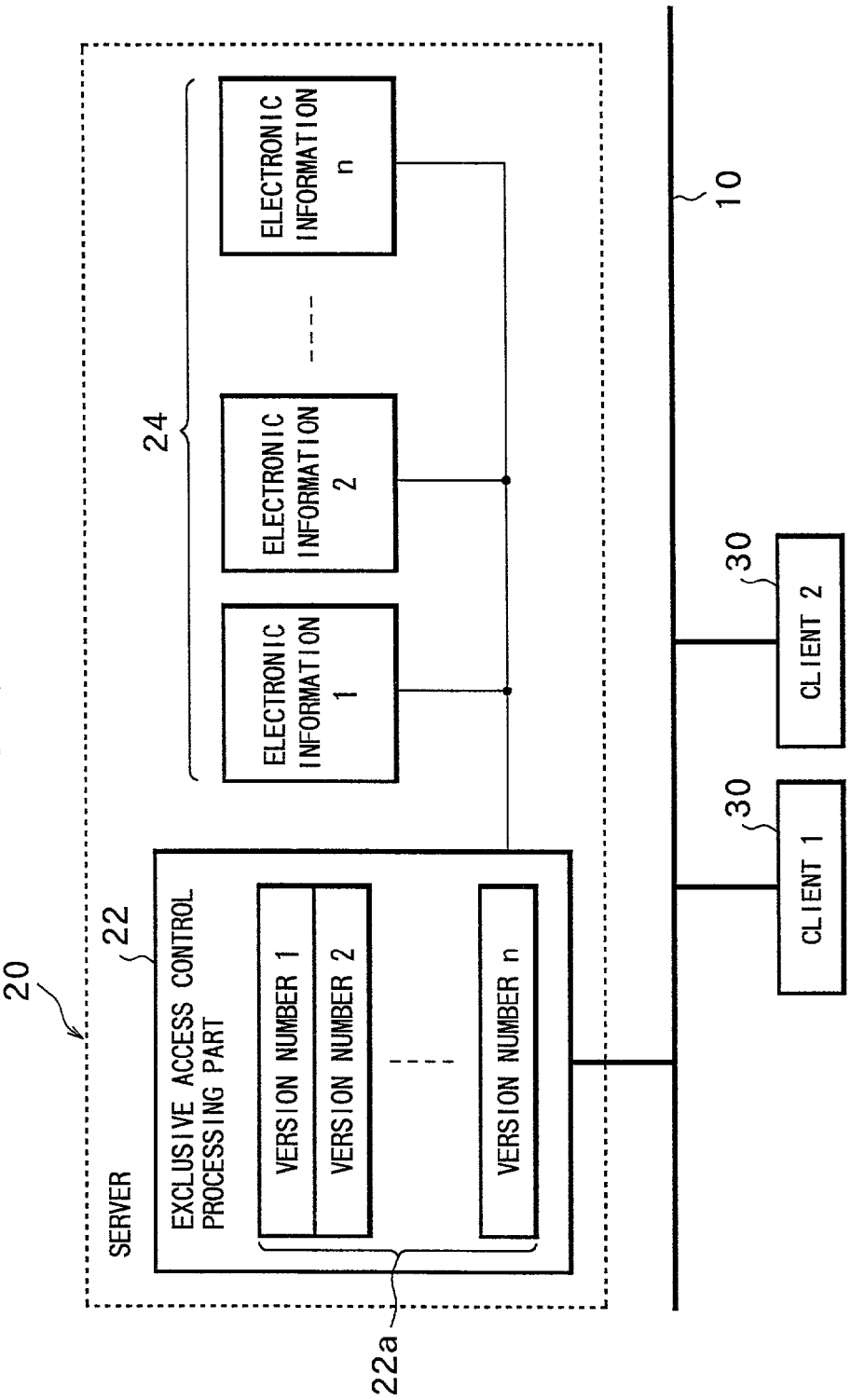
FIG. 1 is a system configuration view of an exclusive access controlling apparatus for electronic information according to the present invention.

FIG. 1 shows a system configuration of an exclusive access controlling apparatus for electronic information according to the present invention (hereinafter merely called "exclusive access controlling apparatus").

The exclusive access controlling apparatus is constructed on a client/server system constituted of a server 20 and at least one client 30 mutually connected via a network 10. Each of the server 20 and client 30 is an electronic computer provided with at least a central processing unit (CPU) and a memory so as to conduct various processes in accordance with a program on the memory.

The server 20 is provided with an exclusive access control processing part 22 and stores various electronic information 24 to be managed by a database system. "Electronic information" means information accessible by an electronic computer, and includes data objects on the memory and files on an external storage device, for example. The exclusive access control processing part 22 is provided with a table 22a (version number holding means) for holding version numbers of the various electronic information 24. The exclusive access control processing part 22 utilizes the version numbers held in the table 22a as semaphore parameters, and conducts an exclusive access control for electronic information in accordance with the flowcharts to be described later.

Figure 2:
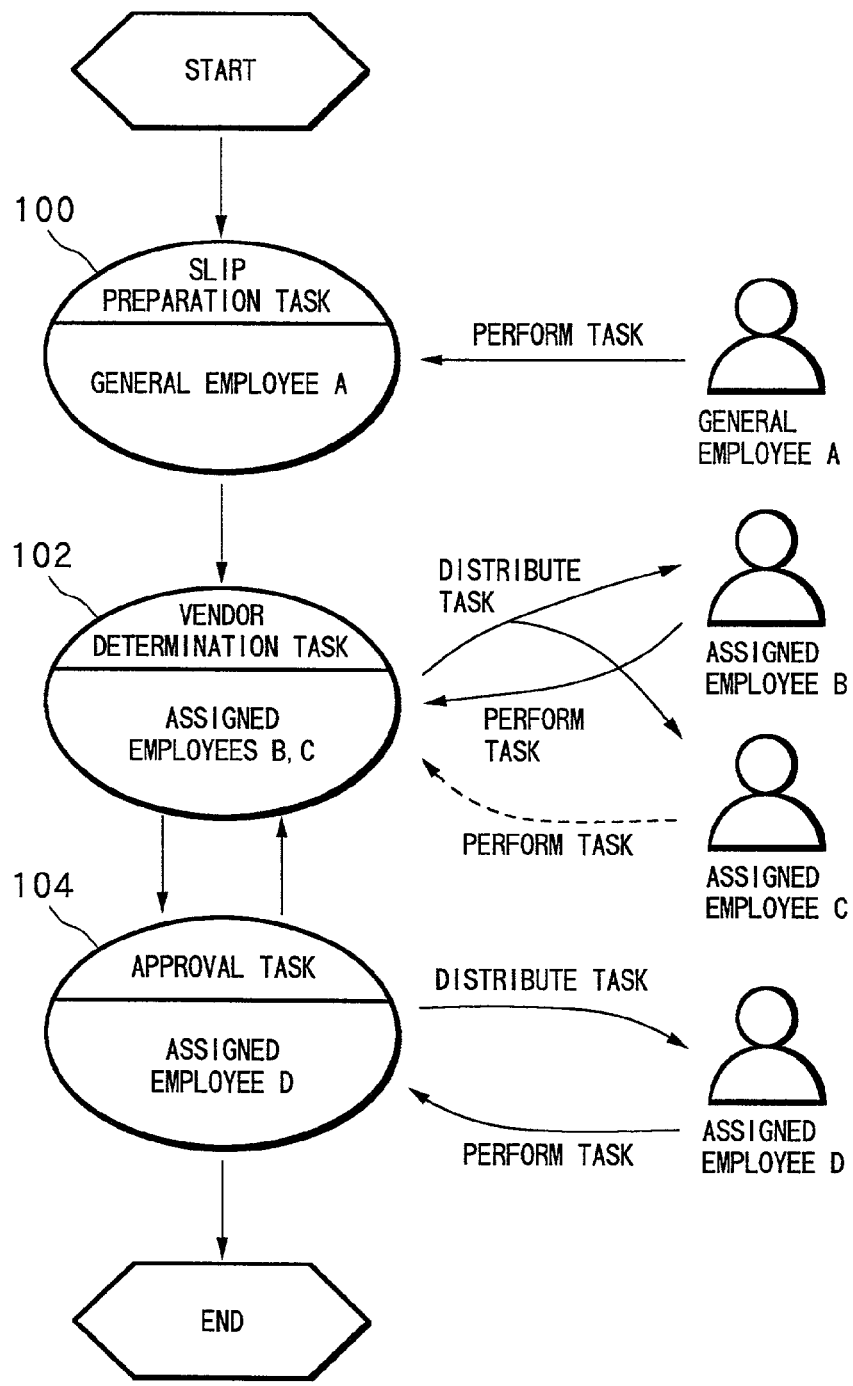
FIG. 2 is an operational explanatory view of a workflow process intended for a purchase slip.

There will be now described an outline of the present invention with reference to a workflow process model of FIG. 2, taking a workflow process intended for processing a purchase slip as an example. The purchase slip corresponds to electronic information, herein.

The process is constituted of three activities each being a task unit, i.e., a slip preparation task 100 of the purchase slip (hereinafter merely called "slip preparation task"), a vendor determination task 102 and an approval task 104. In the slip preparation task 100, the purchase slip designating "the kind and the number of things to be purchased" is prepared by a general employee A acting as an operator. Upon preparation of the purchase slip, the process transfers to the vendor determination task 102. In this vendor determination task 102, vendors are determined by a plurality of assigned employees B, C acting as operators. The reason why the plurality of assigned employees is required is that a lot of purchase slips are to be dealt with immediately. Upon determination of each vendor, the process transfers to the approval task 104. In the approval task 104, approval is made by an assigned employee D as an operator so as to determine the appropriateness of the purchase. The process is completed when the purchase is approved, whereas the process is returned to the vendor determination task 102 when the purchase is rejected.

There will be now clarified the problem in the prior art, with reference to the workflow model of FIG. 2.

In the vendor determination task 102, an initial state of the purchase slip is assumed to be X (hereinafter called "state X"; and the same rule applies corresponding to the following). It is further assumed that the processing request from the assigned employee B is firstly executed and the processing request from the assigned employee C is executed after a certain period of time in such a situation that one vendor was somehow determined by both of the assigned employees B, C. In this situation, the purchase slip is firstly brought into a state Y based on the processing request from the assigned employee B. Thereafter, the process transfers to the approval task 104. However, if the purchase is rejected, the process is returned to the vendor determination task 102. If the processing request from the assigned employee C is executed at this time, this is a situation where the processing request assuming the state X is executed although the purchase slip is currently in the state Y. Namely, there is caused such a problem that the process is possible for the purchase slip having its state (version) different from what is intended.

Figure 3:
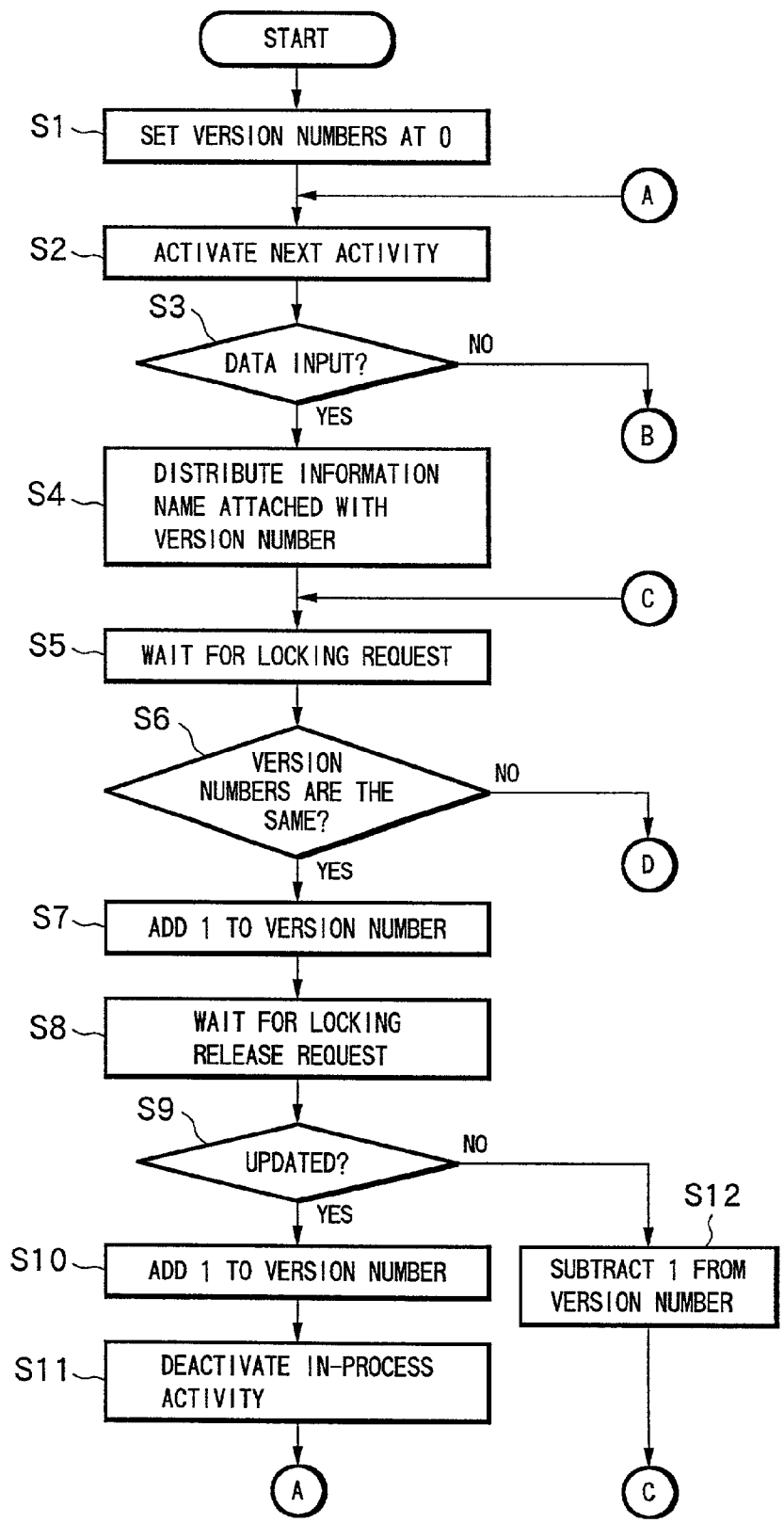
FIG. 3 is a flowchart showing the contents of the exclusive access control for electronic information according to the present invention.
Figure 4:
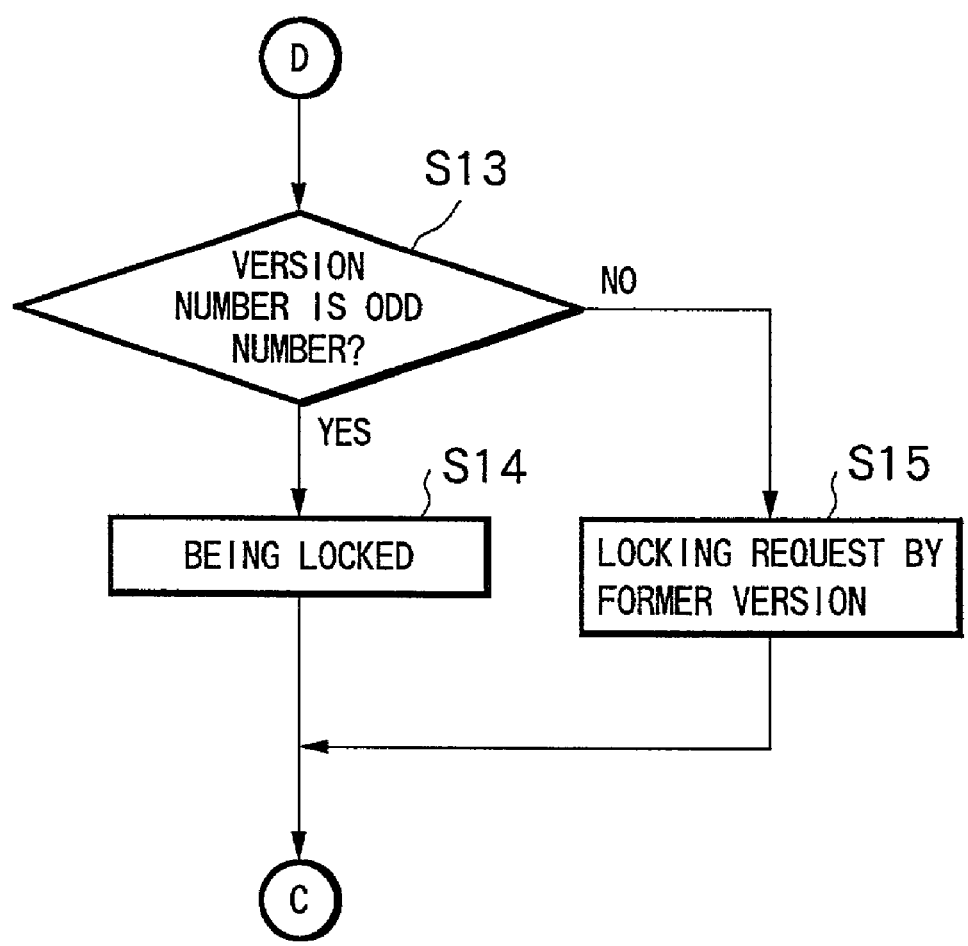
FIG. 4 is a flowchart showing the contents of the exclusive access control for electronic information according to the present invention.
Figure 5:
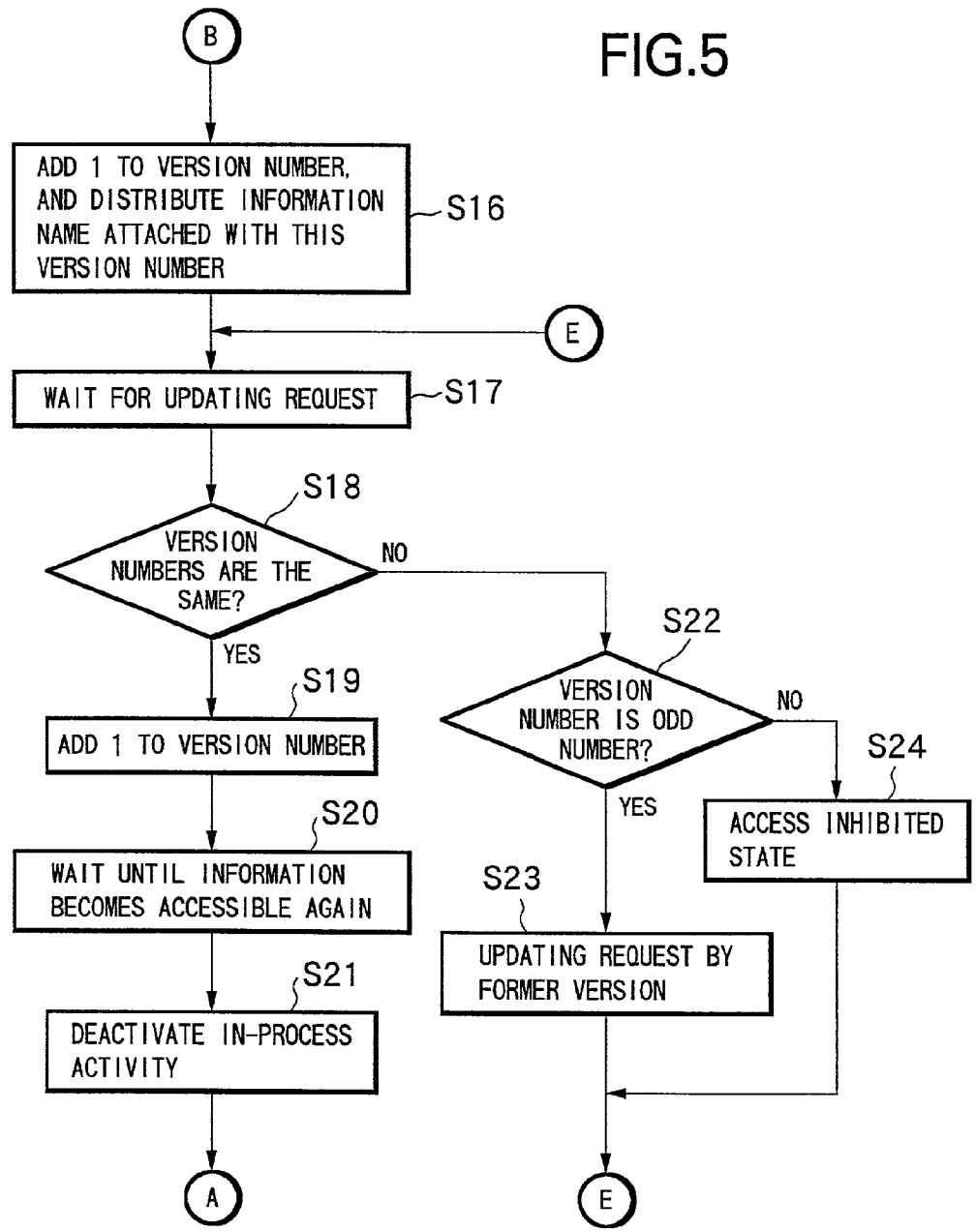
FIG. 5 is a flowchart showing the contents of the exclusive access control for electronic information according to the present invention.

To overcome such a problem, executed in the exclusive access control processing part 22 is the process in accordance with the flowcharts shown in FIGS. 3 through 5.

At step 1 (abbreviated to "S1" in FIG. 3; and the same rule applies corresponding to the following), those version numbers held in the table 22a corresponding to respective electronic information 24 are set at 0 (zero).

At step 2, the next activity as a processing target is activated. Namely, in the workflow model of FIG. 2, the slip preparation task 100 is activated just after starting the process. Thereafter, the vendor determination task 102 and approval task 104 are duly activated corresponding to the progress of the process.

At step 3, it is judged whether or not a data input task has been conducted in the activated activity. The flow advances to step 4 if conducted (Yes), and advances to step 16 if not (No). The reason why the procedures are changed corresponding to the presence/absence a data input, is that there is such a possibility that tasks are required to be batch processed in a particular activity, for example, i.e., in the approval task 104 of the workflow model of FIG. 2, for example, there is such a possibility to collectively approve a lot of purchase slips derived from vendor determination tasks 102.

At step 4, the clients 30 of respective assigned employees are distributed with electronic information names attached with version numbers, respectively. The electronic information names to be distributed are created by attaching version numbers read out from the table 22*a* to those names (appellations) unique to respective electronic information within the exclusive access controlling apparatus. Namely, (electronic information name to be distributed)=(name which is unique to the electronic information)+(the version number of the electronic information). Note, it is possible to substitute a version number for lower several digits of a unique electronic information name to be distributed, if the unique electronic information appellation is so long. Those assigned employees having received electronic information names attached with version numbers, respectively, are to issue processing requests in the respective activities, based on the electronic information names, respectively.

The procedure at step 4 corresponds to electronic information name creating means, electronic information name distributing means, electronic information name re-distributing means, an electronic information name creating process, an electronic information name distributing process, an electronic information name creating function and an electronic information name distributing function.

At step 5, there is conducted a procedure for waiting for a locking request from each client 30, i.e., an access request for the electronic information 24. At this time, transmitted from each client 30 is a locking request including the distributed electronic information name.

At step 6, there is conducted a comparison procedure for the version number of electronic information 24. Namely, the unique electronic information name and its version number are extracted from the locking request transmitted from the client 30. Then, the extracted version number is compared with the version number retrieved from the table 22*a* based on the extracted unique electronic information name. Based on the result, the flow advances to step 7 if both version numbers are the same (Yes), while the flow advances to step 13 if not (No).

Note, the procedure at step 6 corresponds to version number judging means, a version number judging process and a version number judging function.

At step 7, there is added 1 (one) to the version number held in the table 22*a*, which corresponds to the electronic information 24. Namely, if an access for electronic information 24 is requested, the version number is incremented by 1.

Note, the procedure at step 7 corresponds to access permitting means, an access permitting process and an access permitting function.

At step 8, there is conducted a procedure for waiting a locking release request from the client 30, i.e., an access termination request for the electronic information 24. At this time, the locking release request includes update information indicating whether or not the contents of the electronic information 24 have been updated.

At step 9, it is judged whether or not the contents of the electronic information 24 have been updated, based on the update information included in the locking release request. The flow advances to step 10 if the contents of the electronic information 24 have been updated (Yes), while the flow advances to step 12 if the contents of the electronic information 24 have not been updated (No).

At step 10, the version number of the electronic information 24 is added with 1 (one). Namely, the version number of the electronic information 24 is resultantly increased by 2 (two), such as "0, 2, 4, . . . ," each time the contents of the electronic information 24 have been updated.

At step 11, the in-process activity is deactivated. The flow then jumps to step 2.

Meanwhile, at step 12, 1 (one) is subtracted from the version number of the electronic information 24. Namely, the version number is to be restored to the former state, if the contents of the electronic information 24 have not been updated. Then, the flow jumps to step 5.

At step 13, it is judged whether or not the version number held in the table 22*a* is an odd number. If the version number is an odd number, the flow advances to step 14 (Yes), to thereby judge that the electronic information 24 subject to the locking request is being locked and the judgment result is returned to the pertinent client 30. Contrary, if the version number is an even number, the flow advances to step 15 (No), to thereby judge that the locking request target is the electronic information 24 of the former version and the judgment result is returned to the pertinent client 30. The flow then jumps to step 5.

Namely, by the procedures at steps 13 through 15, an analysis is made on the reason for the impossibility of the locking, based on the version number included in the locking request. Further, the analysis result is returned to the client 30. Thus, the client 30 having received the analysis result is allowed to understand the reason for the impossibility of the locking, by displaying the contents of the analysis result.

The procedures at steps 13 through 15 correspond to reason analysis means.

At steps 16 through 24, there are conducted procedures in the absence of data input, i.e., there is conducted batch processing. The details thereof will be described hereinafter.

At step 16, there is added 1 (one) to the version number of the electronic information 24, and the electronic information name attached with the version number is distributed to the clients 30. The explanation of the electronic information name to be distributed is omitted here, since it is created in the same manner as that at step 4.

The procedure at step 16 corresponds to the electronic information name creating means, the electronic information name distributing means, the electronic information name re-distributing means, the electronic information name creating process, the electronic information name distributing process, the electronic information name creating function and the electronic information name distributing function.

At step 17, there is conducted a procedure for waiting for an updating request from the client 30. To be noted here is that what is waited for is not a locking request of electronic information 24 but an updating request thereof. Namely, in the batch processing, there is conducted only an approval procedure as to whether or not the flow may transfer to the next task. Thus, it is unnecessary to deal with a locking request for actually updating the contents of electronic information 24, in the batch processing. As a result, the traffic amount in the network 10 is reduced, and there can be expected an improvement of a processing speed and the like.

At step 18, a comparison procedure for the version number of electronic information 24 is conducted. Namely, the unique electronic information name and its version number are extracted from the updating request transmitted from the client 30. Then, the extracted version number is compared with the version number retrieved from the table 22a based on the extracted unique electronic information name. Based on the result, the flow advances to step 19 if both version numbers are the same (Yes), while the flow advances to step 22 if not (No).

Note, the procedure at step 18 corresponds to the version number judging means, the version number judging process and the version number judging function.

At step 19, there is added 1 (one) to the version number held in the table 22a, which corresponds to the electronic information 24. Namely, an updating request for electronic information 24 leads to a resultant increase of its version number by 2.

Note, the procedure at step 19 corresponds to the access permitting means, the access permitting process and the access permitting function. Further, the procedures at steps 1, 7, 10, 12, 16 and 19 correspond to version number updating means, a version number updating process and a version number updating function.

At step 20, there is conducted a procedure for waiting until the electronic information 24 again becomes accessible.

At step 21, the in-process activity is deactivated. The flow then jumps to step 2.

At step 22, it is judged whether or not the version number held in the table 22a is an odd number. If the pertinent version number is an odd number, the flow advances to step 23 (Yes), to thereby judge that the updating request target is the electronic information 24 of the former version, and the judgment result is returned to the client 30. Contrary, if the version number is an even number, the flow advances to step 24 (No) to thereby judge that the electronic information 24 is in an access inhibited state and the judgment result is returned to the client 30. The flow then jumps to step 17.

Namely, by the procedures at steps 22 through 24, an analysis is made on the reason for the impossibility of the updating, based on the version number included in the updating request. Further, the analysis result is returned to the client 30. Thus, the client 30 having received the analysis result is allowed to understand the reason for the impossibility of the updating, by displaying the contents of the analysis result. The procedures at steps 22 through 24 correspond to the reason analysis means.

According to the above explained procedures at steps 1 through 24, when each activity is activated, an electronic information name is distributed to the client 30 in charge of the task of the each activity. This electronic information name includes the unique electronic information name and its version number. Further, when an access request is conducted for the electronic information 24, the unique electronic information name and the version number are extracted from the access request. Then, the extracted version number is compared with the version number held in the table 22a specified by the extracted unique electronic information name. Coincidence of both version numbers allows access to the electronic information 24, and a discrepancy between them results in an analysis of the reason.

At this time, the version number held in the table 22a is sequentially changed to "0, 2, 4, . . . " each time the version of the electronic information 24 is updated. Thus, any access request based on a former version for the electronic information 24 is rejected. Further, when the task is accompanied by a data input, the version number held in the table 22a is increased by 1 to become an odd number during the time in which the electronic information 24 is being locked, thereby preventing simultaneous accesses.

Thus, the exclusive access control of electronic information 24 restricted to particular versions can be conducted, without using any special process for managing the versions of electronic information 24. Further, it becomes unnecessary to consider and provide a process to avoid inappropriate overwriting of the newest electronic information 24 by a processing request for the former version of the electronic information 24 even in a case where there occurs a time lag for processing due to a difference in network path. This allows realization of an exclusive access control having higher reliability with a simple constitution.

It is noted that the procedures at steps 8 through 15 and steps 20 through 24 are rendered to be multi-threaded, in view of the plurality of jobs to be processed simultaneously.

There will be now explained an actual example for processing the workflow model of FIG. 2 based on the flowchart of FIGS. 3 through 5, so as to facilitate understanding the contents of the above process.

When the process of the workflow is started, the version numbers held in the table 22a of the exclusive access control processing part 22 are initialized to "0000", respectively (step 1). Then, the activity for conducting the slip preparation task 100 is activated (step 2), and it is judged whether or not a data input has been conducted in the slip preparation task 100 (step 3). In the slip preparation task 100, since a data input has been conducted for designating "the kind and the number of things to be purchased", the general employee A is distributed with an electronic information name such as "DATUM0000" which has been attached with the version number "0000" held in the table 22a (step 4). It is noted that the general employee A of course represents every employee having a possibility to conduct slip preparation.

Thereafter, the process is kept waiting until the general employee A issues a locking request (step 5). Upon the locking request, there is conducted an inspection of corresponding two version numbers (step 6). The situation here is just after starting the process, so that such two version numbers are the same. Thus, to indicate that the electronic information is being locked, the version number held in the table 22a is increased by 1 (one) to become "0001" (step 7). The process is thereafter kept waiting until a locking release request from the general employee A is issued, i.e., until a request to transfer to the next activity arrives (step 8).

Upon the locking release request from the general employee A, it is judged whether or not the purchase slip has been updated (step 9). When the purchase slip has been updated, the version number held in the table 22a is added with 1 to become "0002" (step 10) and the activity of the slip preparation task 100 is deactivated (step 11). Contrary, when the purchase slip has not been updated, the version number held in the table 22a is subtracted by 1 and brought back to "0000" (step 12), and the process is again kept waiting for the locking request (step 5).

Upon a request from the general employee A to transfer to the next activity in the activity of the slip preparation task 100, there is activated the activity of the vendor determination task 102 (step 2). In the vendor determination task 102, it is judged whether or not a data input task has been conducted (step 3). Since a vendor is input here, the electronic information name "DATUM0002" having been attached with the version number "0002" held in the table 22a is distributed to the assigned employees B, C (step 4).

Thereafter, the process is kept waiting until either one of the assigned employees B, C issues a locking request (step 5), and upon the locking request, there is conducted an inspection of corresponding two version numbers (step 6). The situation here is assumed that both of assigned employees B, C have issued locking requests and that the locking request from the assigned employee B has antecedently reached the server 20. In this case, the version number included in the locking request from the assigned employee B is "0002", and the version number held in the table 22a is "0002". Namely, both version numbers are the same, so that the version number held in the table 22a is increased by 1 to become "0003" so as to indicate that the electronic information is being locked (step 7). The process is thereafter kept waiting until a locking release request from the assigned employee B is issued, i.e., until a request to transfer to the next activity arrives (step 8). During waiting, subsequent arrival of the locking request from the assigned employee C causes an inspection of the corresponding two version numbers by the same procedure. However, such a belated locking request is not admitted, since the version number included in the locking request is "0002" whereas the version number held in the table 22a is already "0003".

Upon a locking release request from the assigned employee B, it is judged whether or not the purchase slip has been updated (step 9). When the purchase slip has been updated, the version number held in the table 22a is added with 1 to become "0004" (step 10) and the activity of the vendor determination task 102 is deactivated (step 11). Contrary, when the purchase slip has not been updated, the version number held in the table 22a is subtracted by 1 and brought back to "0002" (step 12), and the process is again kept waiting for a locking request (step 5).

Upon a request from the assigned employee B to transfer to the next activity in the activity of the vendor determination task 102, the activity of the approval task 104 is activated (step 2). In the approval task 104, it is judged whether or not a data input task has been conducted (step 3). Since the approval task here is batch processing without any data input, the version number held in the table 22a is added with 1 to become "0005", and then the electronic information name "DATUM0005" attached with the thus prepared version number "0005" is distributed to the assigned employee D (step 16).

Thereafter, the process is kept waiting until the assigned employee D issues an updating request, i.e., his/her approval (step 17). Upon the updating request, an inspection of the corresponding two version numbers is performed (step 18). In this situation, the version number included in the updating request from the assigned employee D is "0005" and the version number held in the table 22a is "0005", so that they are the same. Thus, the version number held in the table 22a is increased by 1 to become "0006" to indicate that the purchase slip has been updated (step 19). Thereafter, the process is kept waiting until the updating task is completed (step 20), and then the activity of the approval task 104 is deactivated (step 21).

When the purchase slip is rejected, the process is returned to the vendor determination task 102, so that the activity of the vendor determination task 102 is activated (step 2). In the vendor determination task 102, it is judged whether or not a data input task has been conducted (step 3). Since a vendor shall be input here, the electronic information name such as "DATUM0006" having been attached with the version number "0006" held in the table 22a is distributed to the assigned employees B, C (step 4).

At this time, if the locking request from the assigned employee C based on the former vendor determination task 102 arrives, there is started the pertinent procedure. However, such a locking request is not admitted, since the version number "0002" included in the locking request from the assigned employee C is different from the version number "0006" held in the table 22a.

In this way, the purchase slip is processed based on only a request from the assigned employee who has a due process right. Thus, the purchase slip is never updated, for example, by a processing request for the former version of the purchase slip. This enables an improvement of the reliability and stability of a purchase slip as electronic information.

By recording a program for realizing such functions into a recording medium such as a magnetic tape, magnetic disk, magnetic drum, IC card, and CD-ROM, the exclusive access controlling program according to the present invention can be distributed into the market. Further, those who have obtained such a recording medium are allowed to readily construct the exclusive access controlling apparatus according to the present invention, making use of a general client/server system, for example.

INDUSTRIAL APPLICABILITY

As explained in the above, the exclusive access controlling apparatus and exclusive access controlling method for electronic information according to the present invention are extremely useful in that these are capable of realizing the exclusive access control higher reliability with a simple constitution for electronic information. Further, the recording medium recorded with the exclusive access controlling program for electronic information according to the present invention is also extremely useful in that the same is capable of readily constructing the exclusive access controlling apparatus for electronic information, making use of a general computer system.

The invention claimed is:

1. An exclusive access controlling apparatus for electronic information comprising:
version number holding means for holding a version number of electronic information;
electronic information name creating means for creating an electronic information name to be prepared by attaching the version number held in said version number holding means to an appellation unique to the electronic information;
electronic information name distributing means for distributing the electronic information name created by said electronic information name creating means, to users of the electronic information;
version number judging means for judging whether or not the version number included in said electronic information name coincides with the version number held in said version number holding means, when the electronic information to be specified by the electronic information name distributed by said electronic information name distributing means is subject to an access by each user of the electronic information;
access permitting means for permitting an access to the electronic information, only when it is judged by said version number judging means that the two version numbers coincide with each other; and version number updating means for updating the version number held in said version number holding means, when the contents of the electronic information have been updated.

2. An exclusive access controlling apparatus for electronic information according to claim 1, further comprising;

reason analysis means for analyzing, based on the version number held in said version number holding means, a reason of a discrepancy between the both version numbers when they are judged to be discrepant from each other by said version number judging means.

3. An exclusive access controlling apparatus for electronic information according to claim 1, further comprising;

electronic information name re-distributing means for re-distributing an electronic information name newly created by said electronic information name creating means to users of the electronic information, when the contents of the electronic information have been updated.

4. An exclusive access controlling apparatus for electronic information according to claim 2, wherein said version number updating means sets the version number of electronic information at 0 (zero) when the exclusive access control of the electronic information is started, while increasing the version number of the electronic information by 1 (one) while the electronic information is being accessed, and increasing the version number of the electronic information by 2 (two) when the contents of the electronic information have been updated.

5. An exclusive access controlling apparatus for electronic information according to claim 4, wherein said reason analysis means judges that the electronic information is being locked, when the version number of the electronic information is an odd number, and judges that the access to the electronic information is targeted at the electronic information of the former version when the version number of the electronic information is an even number.

6. An exclusive access controlling apparatus for electronic information according to claim 2, wherein said version number updating means sets the version number of electronic information at 0 (zero) when the exclusive access control of the electronic information is started, while increasing the version number of the electronic information by 1 (one), prior to the creation of the electronic information name by said electronic information name creating means, and additionally increasing the version number of the electronic information by 1 (one) when the contents of the electronic information have been updated.

7. An exclusive access controlling apparatus for electronic information according to claim 6 wherein said reason analysis means judges that the access to the electronic information is targeted at the electronic information of the former version when the version number of the electronic information is an even number and judges that the electronic information is in an access inhibited state, when the version number of the electronic information is an odd number.

8. An exclusive access controlling method for electronic information, comprising:

an electronic information name creating process for creating an electronic information name to be prepared by attaching a version number of electronic information held in a table to an appellation unique to the electronic information;

an electronic information name distributing process for distributing the electronic information name created by said electronic information name creating process, to users of the electronic information;

a version number judging process for judging whether or not the version number included in said electronic information name coincides with the version number held in said table, when the electronic information to be specified by the electronic information name distributed by said electronic information name distributing process is subject to an access by each user of the electronic information;

an access permitting process for permitting an access to the electronic information, only when it is judged by said version number judging process that the two version numbers coincide with each other; and a version number updating process for updating the version number held in said table, when the contents of the electronic information have been updated.

9. A recording medium recorded with an exclusive access controlling program for electronic information for performing a process comprising:

an electronic information name creating function for creating an electronic information name to be prepared by attaching a version number of electronic information held in a table with an appellation unique to the electronic information;

an electronic information name distributing function for distributing the electronic information name created by said electronic information name creating function, to users of the electronic information;

a version number judging function for judging whether or not the version number included in said electronic information name coincides with the version number held in said table, when the electronic information to be specified by the electronic information name distributed by said electronic information name distributing function is subject to an access by each user of the electronic information;

an access permitting function for permitting an access to the electronic information, only when it is judged by said version number judging function that the two version numbers coincide with each other; and a version number updating function for updating the version number held in said table, when the contents of the electronic information have been updated.

10. An exclusive access controlling method comprising:

creating an electronic information name;

attaching a version number to the electronic information name;

holding the version number in a table;

distributing the electronic information name to users of the electronic information;

judging whether or not the version included in the electronic information name coincides with the version number held in the table when the electronic information distributed by said distributing is subject to an access by each user of the electronic information;

permitting access to the electronic information only when it is judged that the two version numbers coincide; and updating the version number held in the table, when the contents of the electronic information have been updated.

* * * * *